March 22, 1927. 1,622,120
C. LYNN
MOTOR DRIVEN SAW
Filed April 3, 1925
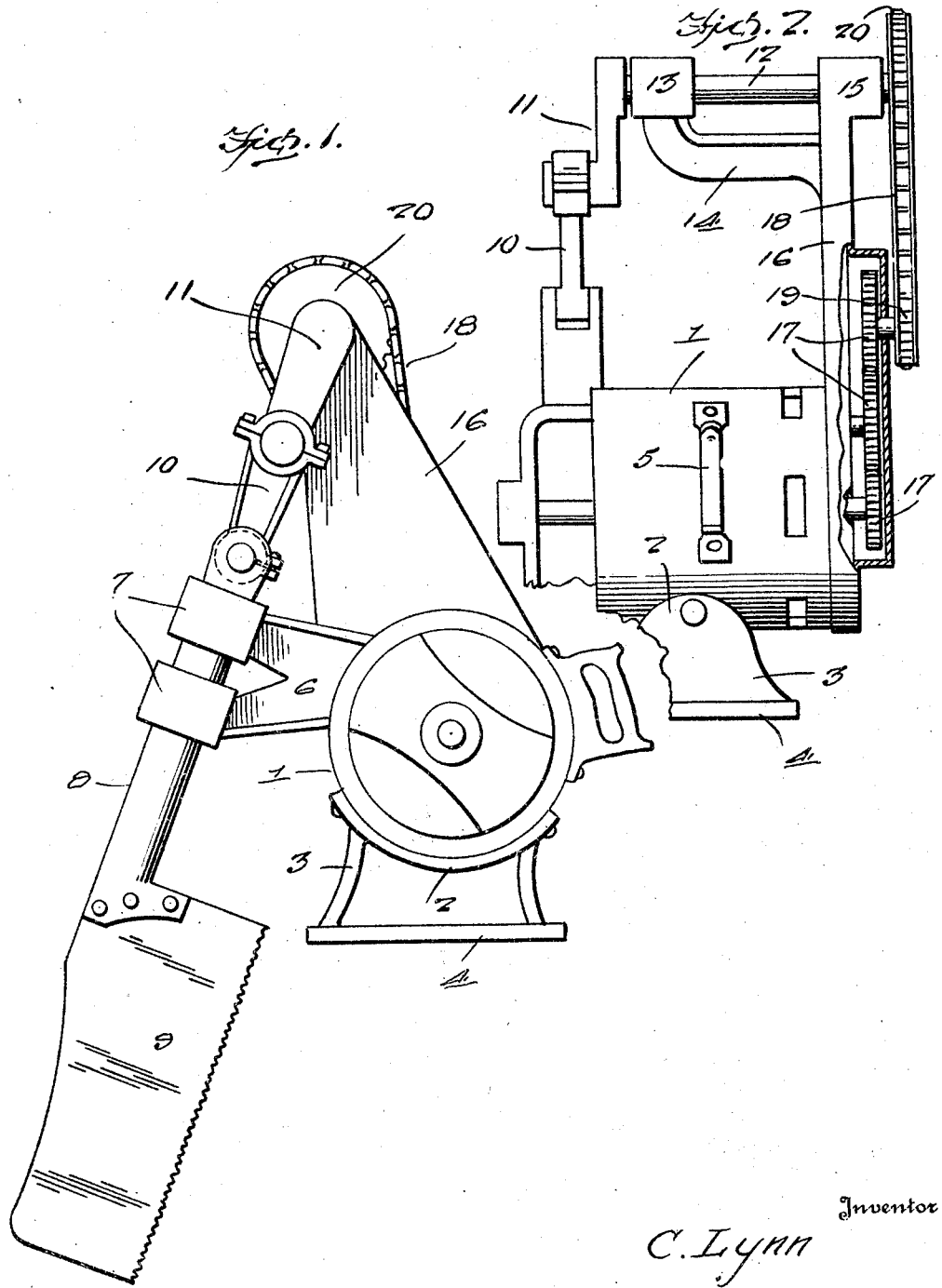

Patented Mar. 22, 1927.

1,622,120

UNITED STATES PATENT OFFICE.

CRAIG LYNN, OF BUTLER, INDIANA.

MOTOR-DRIVEN SAW.

Application filed April 3, 1925. Serial No. 20,469.

This invention relates to an improved motor driven saw, which has been designed to take the place of the common hand saw of the reciprocating type.

My principal object is to provide a motor driven saw of the reciprocating type which is exceedingly light in weight and is capable of cutting small timber, although practical and efficient in almost every field where a common hand saw could be used.

The primary feature of the invention is the means provided for deriving power from an electric motor, and transmitting it to an appropriately mounted reciprocating saw, the power transmitting means being such as to maintain a suitable speed of reciprocation of the saw, and to insure a uniform stroke of the rearward as well as the forward movement.

The particular details, which are such as to permit the device to be conveniently handled and manipulated, will become apparent from the following description and drawing.

In the accompanying drawing forming a part of this application and in which like numerals are employed to designate like parts throughout the same:

Figure 1 is an end elevation of a motor driven saw constructed in accordance with the present invention.

Figure 2 is a rear elevation of the same, with portions broken away and shown in sections to disclose the power transmitting means more plainly.

Referring to the drawings in detail, it will be seen that the reference character 1 designates a conventional electric motor which is fastened by rivets or the like in the saddle 2. This saddle is fastened to the upper end of the bowed webs 3 which are in turn integral with the supporting base 4. This base is such as to permit the device to be bodily moved across a table or the like. To facilitate such movement, an appropriate handle 5 is fastened to the motor casing. Also, fastened to this casing, or to a part in association with the casing is an angularly disposed arm 6 provided on its outer end with spaced bearings 7. Slidable in these bearings is the cylindrical operating rod 8 of the reciprocatory saw blade 9. Novel means driven from the aforesaid motor is associated with the saw for insuring the desired uniform operation. The means preferably comprises a connecting rod 10 fastened to a crank arm 11 mounted on the rotary driven shaft 12. This shaft is journaled in a bearing 13 on the bracket arm 14 and also in another bearing 15 on the vertically extending gear casing 16. This gear casing is supported from one end of the motor, and a portion of the casing is enlarged to accommodate a train of gears 17 which serve to drive a sprocket chain 18 trained over the sprockets 19 and 20. It will be observed that the sprocket 20 is on the outer end of the shaft 12 and is of a size to reduce the speed of rotation of the shaft to a moderate speed.

From the foregoing it will be seen that when the motor is set into operation, the sprocket chain will be driven from the intermeshing gears, and the sprocket chain in turn will drive the shaft 12, which through the crank connection, will reciprocate the saw back and forth to simulate the action of the common handle. The device may be slidably supported on a table or the like, and manipulated by the handle 5 on the motor casing to act upon the work in some way the same way that would take place with the ordinary hand saw. As stated, the device is comparatively light in weight, and for this reason no difficulty will be experienced in handling it. The saw is preferably detachably connected with the connecting rod so that it may be replaced by a different size saw blade for acting on light weight work such as veneer wall boards and the like.

It is believed that if the specification is very thoroughly considered in connection with the accompanying drawings, persons skilled in the art to which the invention relates, will be able to obtain a clear understanding of the same, and of the advantages derived from the particular construction employed. For this reason a more lengthy description of the invention is deemed unnecessary.

While the preferred embodiment of the invention has been shown and described, it is to be understood that minor changes coming within the field of invention claimed may be resorted to if desired.

Having thus described the invention, what I claim as new is:—

A power operated saw of the class described comprising a base, a saddle supported on said base, a motor mounted in said saddle, an arm extending laterally from said motor at one end and provided with a pair of spaced bearings alined at an incline and substantially tangential to a circle concentric about the axis of the motor, an operating rod of a saw slidable in said bearings, a bracket arm rising from the other end of the motor and having a gear casing formed thereon, gearing in the casing oppositely associated with the motor, an extension disposed laterally of said bracket arm and projecting towards said one end of the motor and terminating in a bearing, said bracket arm terminating in a bearing alined with the last-mentioned bearing, a shaft journaled in the last two mentioned bearings to be disposed substantially horizontally, chain and socket means oppositely associating said shaft with said gearing, a crank on said shaft adjacent the bearing of the extension, a pitman on said crank and engaged with said operating rod.

In testimony whereof I affix my signature.

CRAIG LYNN.